United States Patent

Engel et al.

[15] 3,648,106
[45] Mar. 7, 1972

[54] DYNAMIC REACTORLESS HIGH-FREQUENCY VAPOR LAMP BALLAST

[72] Inventors: Joseph C. Engel; Robert T. Elms, both of Monroeville, Pa.

[73] Assignee: Westinghouse Electric Corporation, Pittsburgh, Pa.

[22] Filed: Feb. 24, 1970

[21] Appl. No.: 13,661

[52] U.S. Cl.............................315/291, 315/307, 315/360, 315/209
[51] Int. Cl....................................H05b 37/02, H05b 41/30
[58] Field of Search..................315/291, 306, 307, 309, 310, 315/360, 100 U, 130

[56] References Cited

UNITED STATES PATENTS

| | | | |
|---|---|---|---|
| 3,422,310 | 1/1969 | Widmayer | 315/291 |
| 3,486,069 | 12/1969 | Mahler | 315/291 X |
| 3,280,368 | 10/1966 | Ahmed et al. | 315/100 U |
| 3,331,987 | 7/1967 | Powell, Jr. | 315/100 U |
| 3,193,726 | 7/1965 | Powell, Jr. | 315/100 U |
| 3,222,572 | 12/1965 | Powell, Jr. | 315/310 X |

*Primary Examiner*—Herman Karl Saalbach
*Assistant Examiner*—Saxfield Chatmon, Jr.
*Attorney*—A. T. Stratton, W. D. Palmer and Walter G. Sutcliff

[57] ABSTRACT

A control device and method of operation for a discharge lamp which would under normal operation display a runaway discharge characteristic. The control device constitutes a part of a low-impedance power supply which is without any effective current limiting impedance, and is thus a high-efficiency device. A high-frequency discharge sustaining potential is applied across the discharge lamp at a repetition rate of at least about 500 times per second. A feedback control signal is generated based on a predetermined lamp operating condition, and this feedback signal is used to control the duty cycle of operation, with each period of potential application not exceeding about 1.8 milliseconds, and with the duty cycle always being less than unity. The repetition rate of potential application may be simultaneously varied with the duty cycle of a feedback signal so that a particular discharge lamp operates at an optimum repetition rate.

15 Claims, 7 Drawing Figures

Patented March 7, 1972
3,648,106
3 Sheets-Sheet 1
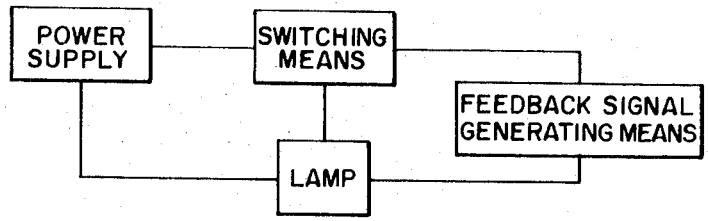
FIG. 1.
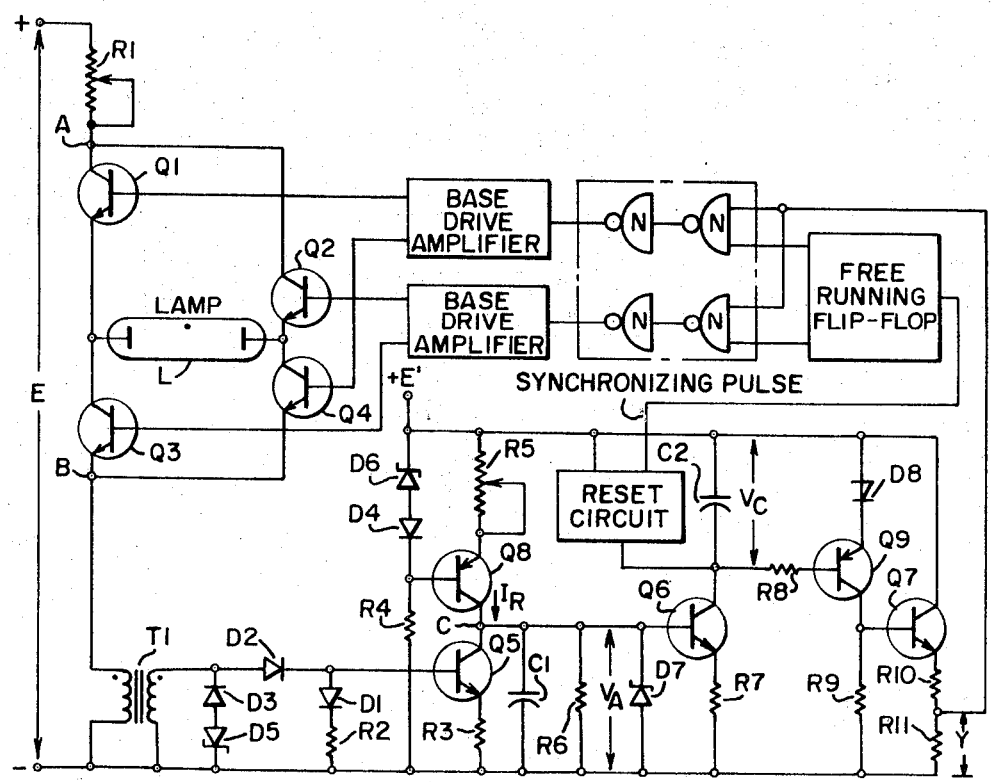
FIG. 2.
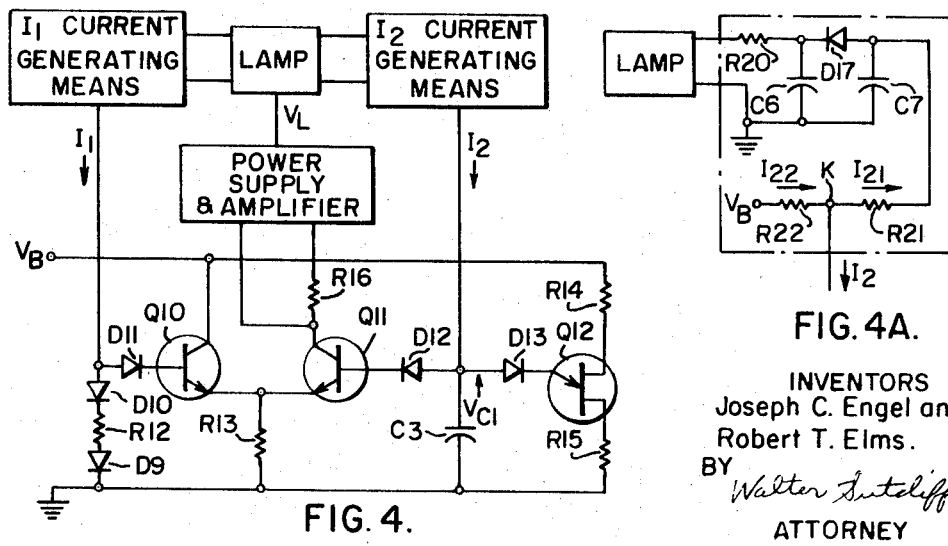
FIG. 4.
FIG. 4A.
INVENTORS
Joseph C. Engel and
Robert T. Elms.
BY Walter Sutcliff
ATTORNEY

DYNAMIC REACTORLESS HIGH-FREQUENCY VAPOR LAMP BALLAST

BACKGROUND OF THE INVENTION

The standard commercial lighting discharge devices, such as the fluorescent lamp and high pressure mercury vapor lamp, are characterized as negative resistance devices. During operation of these devices there exists a nonlinear relationship between the current through the device and the voltage across the device. This nonlinear relationship necessitates controlling the lamp operating parameters to stabilize the operation. In practice, reactive current limiting devices in series with the discharge device are generally utilized to stabilize the operating device.

It has been recognized that the low-pressure mercury discharge fluorescent lamp device, as well as the high-pressure mercury discharge device, can be operated at high frequencies. The lamp types which can be utilized in the present invention have been characterized as exhibiting a runaway discharge under normal operation. This means that the lamp current will continue to increase to a destructive value without a change in lamp potential.

The reactive current limiting elements generally used in the prior art for stabilizing discharge devices result in a significant portion of the energy supplied being expended in controlling the discharge device. The use of such reactive control elements thus diminishes the overall efficiency of the lighting system.

SUMMARY OF THE INVENTION

The present invention presents a control device and a method of operation for discharge lamps which does not include provision of any effective current-limiting impedance means in circuit therewith. A wide variety of discharge lamps which exhibit a runaway discharge when normally operated from a power supply can be used in practicing the invention.

The control device of the present invention constitutes part of a low-impedance power supply for operating the discharge lamps. The control device comprises, input terminals adapted to be connected to a voltage main, and output terminals adapted to be connected to the discharge lamp. Low-impedance switching means are included which are operable rapidly and repetitively, to directly electrically connect and disconnect the input and output terminals at a repetition rate of at least about 500 times per second. The control device has no effective lamp current limiting means in circuit therewith. The switching means are operated to establish a period of potential application which does not exceed about 1.8 milliseconds, as well as and an off period, thus defining a duty cycle of operation. The duty cycle is the ratio of the period of connection of the input and output terminals to the total period between successive connections of the input and output terminals, and this duty cycle is always less than unity. The control device furthermore comprises a feedback control means responsive to a lamp operating condition to generate a feedback output signal indicative of the lamp operating condition. Connection means are provided between the output of the feedback control means and the low-impedance switching means to apply the feedback signal to the switching means operating same to control or vary the duty cycle of operation to maintain the lamp-operating condition at about a predetermined desired level of operation. In the preferred embodiment of the invention the lamp-operating condition, which is monitored to generate the feedback control signal, is the average lamp wattage or power.

It has also been discovered that for each particular type of discharge lamp there is a preferred optimum repetition rate of potential application which varies according to the impedance characteristic of the particular lamp. The repetition rate can be made variable and can be controlled by an additional feedback signal so that the lamp will find its own preferred mode of operation. This repetition rate control effected simultaneously with the stabilizing duty cycle control.

A generalized method of operation will be fully described in reference to the exemplary apparatus set forth in the drawings.

BRIEF DESCRIPTION OF THE DRAWINGS

The invention can be best understood by reference to the exemplary embodiment illustrated in the following:

FIG. 1 is a block diagram outlining the general system;

FIG. 2 is a schematic of a specific embodiment utilized in practicing the present invention;

FIG. 4 is a circuit which is a further embodiment of the present invention by which the repetition rate as well as the duty cycle can be automatically controlled to effect stable lamp operation;

FIG. 4A is an embodiment of a circuit for producing signal 12 as shown in a block form in FIG. 4;

DESCRIPTION OF THE PREFERRED EMBODIMENT

Figure 3:
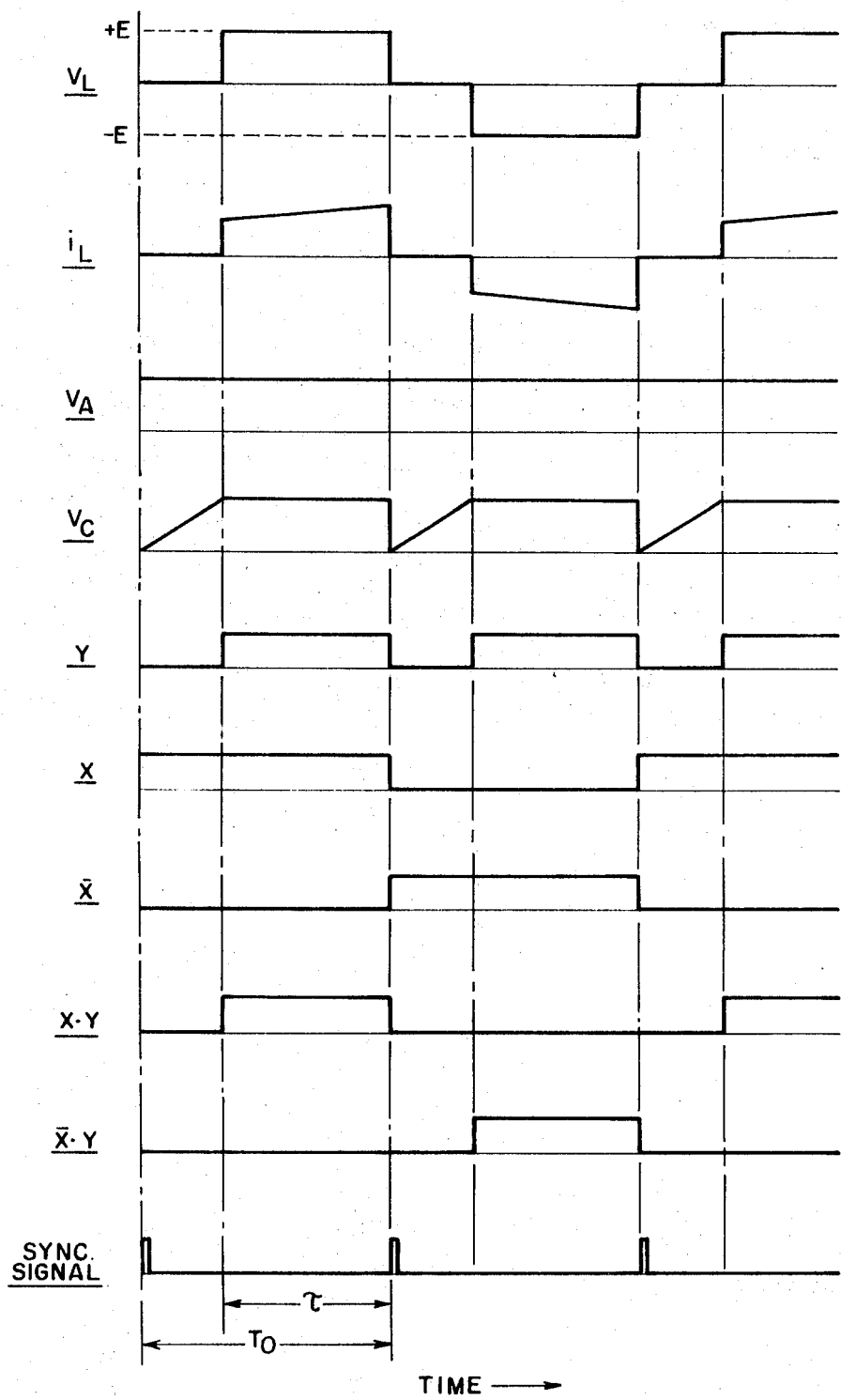
FIG. 3 shows the various waveforms which are typically observed during operation of the system shown in FIG. 2.

The general block diagram in FIG. 1 outlines the operation of the present invention. The power supply and switching means constitutes a low-impedance potential source. The invention can be best understood by reference to the exemplary embodiment shown in FIG. 2, and by a general explanation of its operation. The conventional discharge device L comprises an at least partially light-transmissive envelope, and preferably has operatively spaced electrodes disposed within the space enclosed by the envelope. The discharge-sustaining filling is disposed within the space enclosed by the envelope. The device L, is for example, a standard fluorescent lamp or a high-pressure mercury vapor device. The electrodes of discharge device L are connected across a bridge of high-power transistors Q1, Q2, Q3, Q4, which are arranged to be diagonally driven to connect the potential of $\pm$ E across the device. This transistor bridge comprises the low-impedance switching means. Terminal A of the transistor bridge is connected via a variable resistor R1, which can be completely bypassed or shunted after the startup procedure, to the high side of a potential source. Terminal B of the transistor bridge is connected through the primary of the current transformer T1 to the low side of the potential source. Terminals A and B, thus comprise input terminals adapted to be connected to a voltage main. The bases of transistors Q1 and Q4 are connected to a common base drive circuit, and the bases of Q2 and Q3 are also driven from a common drive circuit, with the driving base currents being controlled as will be explained later. The node where the emitter of Q1 and the collector of Q3, and the node where the emitter of Q2 and the collector of Q4 comprise the output terminals of the control device.

In order to start up the higher impedance discharge devices of the present combinations, a certain level of ionization must be established in the discharge device. This is typically achieved by applying a high-voltage spike across the electrodes such as will be explained by reference to FIG. 6 later. The ionization can also be provided by directing a Tesla coil or other such high-frequency, high-voltage source proximate the device to initiate a discharge in the lamp. The presently described operation and control system can then take over operation of the device. Other starting arrangements can be readily utilized with the present system as will be apparent to one skilled in the art.

The present invention can be best described by reference to the voltage waveforms shown in FIG. 3, which explain the operation of the detailed circuit shown in FIG. 2. This description assumes that the discharge device is in operation and that R1 has been shorted out of the circuit. At time t1 at which time transistors Q1 and Q4 are conducting or turned on, the potential, $V_L$, across the electrodes of the discharge device is +E. A current $i_L$ is established in the discharge device L. It will be noted that the current $i_L$ increases at a somewhat linear rate and the lamp voltage is constant during the time Q1 and Q4 are turned on. The current $i_L$ also flows through the current transformer T1. A logic signal proportional to the lamp current is induced in the secondary of transformer T1. This logic signal flows from the dotted secondary terminal of T1 through resistor R2, neglecting the small base current of transistor Q5. The transformer T1 has a 1 to 100 turns ratio and the logic signal produces a voltage across R2. Transistor Q5 is connected as an emitter follower and thus the voltage across R2 and R3 are equal. Diode D1 in series with R2 cancels the base-emitter drop of Q5. The emitter current and the collector current of Q5 then equals $(R2/R3) \times 100$) $i_L/100$) and flows from node C. A predetermined constant current value, provided by the basic transistorized current source formed by Q8, R5, the 5-volt Zener diode $D_N$, and the potential source E', flows into node C. The current through the variable resistor R5 is $5/R5$, and this constant current acts as a reference value $I_R$. The difference between the reference current $I_R$ and the logic signal current value, $(R2/R3)((i_L/100))$, which is the collector current of Q5, is fed into the parallel configuration of C1 and R6. A voltage $V_A$ is established in this network which is proportional to the difference between the reference signal $I_R$ and the average lamp current being controlled $I_L$. The filter time constant R6 C1 is very long compared with the ontime period of the lamp voltage $V_L$, and thus $V_A$ is shown as a constant in FIG. 2.

The circuit thus far described provides an analog signal $V_A$ which is based on the average lamp current $I_L$. The remaining circuitry is basically digital and converts this average lamp current error signal $V_A$ into a control signal which is utilized to alter the on time and off time of the transistors Q1 through Q4. Transistor Q6 operates as an emitter follower so that the current through R7 is $V_A/R7$. Neglecting the base current of Q9, the collector current of Q6 will flow through C2. The reset circuit shown across C2 is simply a conventional solid state switch which resets the voltage on C2 to zero at the termination of each on period of potential by application of a signal which is synchronous with the application of $V_L$. The collector current of Q6 develops a voltage across C2 of $V_c$ which increase linearly with time. $V_C$ will be equal to $V_A/C2R7$ times the time T which is measured from the beginning of each half cycle. When voltage $V_C$ reaches slightly more than 8 volts, the four-layer trigger diode $D_T$ in the emitter circuit of Q9 fires, thus turning on Q9 and Q7. These transistors Q9 and Q7 remain on until $V_C$ is reset to zero by a synchronized reset signal applied to the solid state reset circuit across C2. During the time that Q7 is on the emitter current through R10 and R11 gives rise to an output voltage Y across R11. The voltage signal Y is combined with the output of a conventional free running flip-flop, which has an output X and $\overline{X}$, to provide a signal which is amplified, by a conventional pulse amplifier, here termed base drive amplifier, and used to drive the transistors Q1 through Q4. The free-running flip-flop of FIG. 2 can be a standard synchronized astable multivibrator, the operation of which is described more fully in "Electronics for Scientists" by H. V. Malmstadt and C. G. Enke, section 9–8. The base drive amplifier component of FIG. 2 is more fully explained in, "Transistor Circuit Design," Engr. Staff of Texas Instruments Inc., p. 245, McGraw-Hill, 1963. A conventional integrated circuit logic element is used to provide the control signal which is generated only when the voltage Y and X coincide, and when Y AND $\overline{X}$ coincide. The X AND Y signal which is transmitted only when there is a voltage Y coincident with X, is amplified and used to drive Q1 and Q4 while the $\overline{X}$ AND Y signal which is transmitted only when there is a voltage Y coincident with $\overline{X}$ is used to drive Q2 and Q3.

It can be readily recognized that as the average value of $(i_L)$ increases or decreases that $V_A$ will be respectively decreased or increased in value. The change in $V_A$ will in turn affect the time for $V_C$ to reach the 8 volt breakdown level. Thus if $(i_L)$ increases, $V_A$ decreases, and the time in which $V_C$ reaches 8 volts will be delayed. This will have the effect of delaying the establishing of voltage Y, so that the feedback control signal X AND Y is transmitted for a shorter period, i.e., Q1 and Q4 will be driven to a conducting state later, the effect of which is to thereby lower the average value of $i_L$ back to the predetermined desired level. The signal $\overline{X}$ AND Y likewise drives Q2 and Q3 toward the same end. Another way of describing what is achieved by thus continuously controlling the period of potential application and the interval period between such applications is to describe the relationship in terms of the duty cycle. The duty cycle is the ratio of potential on time, i.e., time during which potential is applied across the electrodes, to repetition time or the time from initiation of one potential pulse to the next potential pulse. Thus, if the value of $i_L$ is above a predetermined reference value when the device is operating with a given duty cycle, the feedback signal generated will diminish the value of the duty cycle and this will have the effect of bringing $i_L$ back to the predetermined reference value. Again, it must be emphasized that the present method makes this adjustment of duty cycle and adjustment of the operating condition value a continuous operation.

The invention can now be described in more specific terms. It has been discovered that the discharge device L can be a standard low-pressure, mercury discharge, fluorescent lamp, a high-pressure mercury vapor lamp, a metallic additive high pressure mercury vapor device, or a high-pressure sodium-mercury discharge device. It should be understood that any discharge device which exhibits a substantially resistive operating characteristic at high pulse-repetition rates can be utilized in practicing the present invention.

A standard 40-watt low-pressure mercury discharge fluorescent lamp is inserted as L in the circuit shown in FIG. 2. The desired average lamp-operating current for this lamp is about 0.30 ap. The voltage E was found to be preferably 130 volts, and the nominal initial duty cycle is preferably designed to be about 0.75. This lamp does not require the use of the variable load resistor R1 for starting purposes.

The nominal duty cycle can be set at a value which efficiently utilizes the transistors by selecting the value of E. The duty cycle will be continuously adjusted during operation. Initially the duty cycle can be set at about 0.75 by determining that the waveform outputs X and $\overline{X}$ of the flip-flop means each have a square wave duration of 0.2 millisecond. The synchronization signal output of the flip-flop is also generated at 0.2 millisecond intervals. The adjustment of the duty cycle is made by the control signals Y and X, and Y AND $\overline{X}$, which are generated only when $V_c$ reaches the trigger potential of diode $D_T$ in the emitter circuit of Q9, at which point Q9 and Q7 become conductive and voltage Y is generated. Since $V_c = V_a/C2R7$ t, an adjustment of these parameters will effect the time for establishing the voltage Y, and correspondingly the time for application of voltage across the lamp as is shown in FIG. 3. During operation the duty cycle will be varied continuously as the lamp current deviates from the reference current, by varying the period of potential application. The voltage waveforms X and $\overline{X}$ are preferably 0.2 millisecond in duration each, and the system parameters should be adjusted to provide a 50- microsecond delay before $V_c$ reaches the breakdown potential of $D_T$, to thus provide a 0.75 duty cycle.

The synchronization signal is used to reset $V_c$ across C2 to zero periodically in synchronization with $V_L$ going to zero as shown in FIG. 3, and thus allowing continuous control during operation. The reset circuit shown in FIG. 2 can be any of a number of solid state switches which is triggerable by the synchronizing pulse to a closed position, to thus shunt C2, and make $V_c$ go to zero1.

It has been discovered that when L is a standard 40 watt fluorescent lamp, that the repetition rate of the potential application is preferably from 1,000 to 40,000 times per second, at a reasonable duty cycle. For a slower repetition rate, three are consequent larger changes in current and average conductivity during the period of potential application, which would result in nonstable operation.

Figure 5:
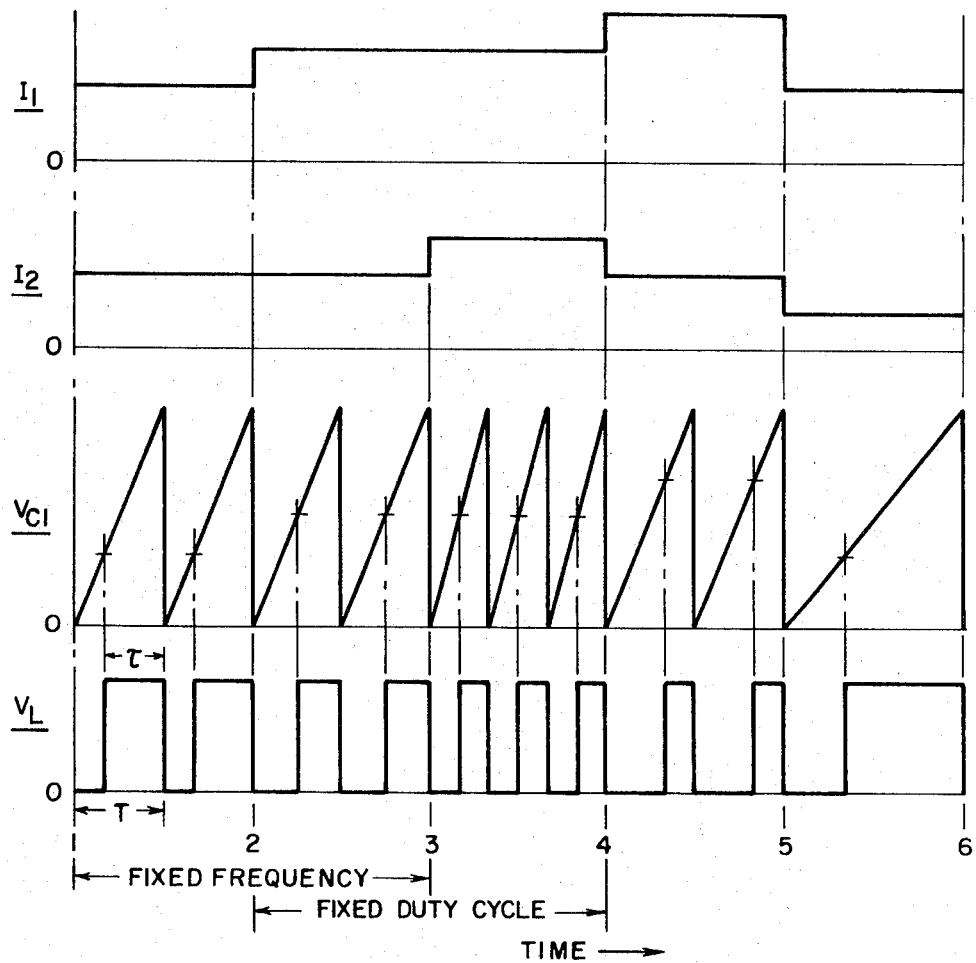
FIG. 5 shows the various waveforms which are produced during operation of the system shown in FIG. 4.

As another example, a standard 400-watt high-pressure mercury vapor arc-discharge device as shown in FIG. 5 is lamp L in the diagram of FIG. 2. The preferred value of E is 173 volts, and variable resistor R1 is set at approximately 75 ohms during a warmup period of several minutes, after which R1 is shunted out of the circuit. The duty cycle is preferably designed at about 0.75. The reference current $I_R$ can be readily set at about 2.3 a. by adjusting the value of E and R5.

The repetition rate is preferably from about 2 to 5 thousand times per second when the lamp being operated is a conventional 400-watt high-pressure mercury vapor discharge. At higher repetition rate frequencies a standing acoustical wave develops which impedes operation of this particular device.

The discharge device can also be a standard 400-watt metal halide additive high-pressure mercury vapor lamp as per U.S. Pat. No. 3,234,421 issued Feb. 8, 1966. In this case it has been found desirable to set E at 154 volts. R1 is 60 ohms and is shorted after a warmup period of several minutes. The duty cycle is preferably designed to be about 0.75. The reference current $I_R$ can be readily set at about 2.6 by adjusting the value of E and R5. In general, for metal halide additive devices, the repetition rate is preferably from about 2 to 20 thousand times per second.

The discharge device can also be a standard 400-watt sodium-mercury high-pressure device such as described. The preferred value of E is 150 volts and R1 is set at about 55 ohms during a warmup period of several minutes, after which R1 is shunted out of the circuit. The duty cycle is preferably designed to be about 0.75. The reference current $I_R$ can be readily set at about 2.67 a. by adjusting the value of E and R5. For such a discharge device the repetition rate of potential application is preferably from about 8 to 40 thousand per second.

While the lamp operating current was the parameter which was monitored to effect the control of the present combination, other lamp-operating conditions such as the light output as monitored by a photoresponsive means, or lamp power as monitored by a device such as described in copending application, Ser. No. 807,658, filed Mar. 17, 1969, owned by the assignee of the present invention.

In the preferred embodiment of the invention as described by the working example, the duty cycle was controlled by varying the turn on time of potential application, or stated another way, the pulse width of the energization waveform was modulated. The duty cycle can also be controlled by varying the repetition rate of the free running flip-flop signals, or by varying both the pulse width and the repetition rate.

While the waveform potential applied across the discharge device in the circuit shown in FIG. 2, is a reversing potential square wave it must be stressed that there need be no reversal of the potential, nor is it essential that the waveform signal be a square wave. The use of a square wave pulse does keep the lamp current fairly constant and is thus the preferred method of operation. The applied waveform could similarly be a repetitive pulse of the same polarity.

In practicing the present invention the control device is generally provided with means for providing a fixed repetition rate which is predetermined for a given type of discharge device. In general, the higher operating current and lower operating voltage device has a very rapid response time, or stated another way the dynamic impedance varies in a shorter period of time, and the preferred repetition rate of potential application should have a higher frequency to maintain a stable operating condition.

The dynamic impedance can be determined for various discharge devices and the preferred repetition rate provided by fixing the frequency of the synchronizing pulse of the circuit of FIG. 2, which is derived from the flip-flop device.

It has been determined that a repetition frequency of at least about 500 times per second for the application of the operating potential is required for lamps operated in accordance with the present invention. The actual control function, which compensates for variations in lamp operating characteristics, is carried out by continuously varying the duty cycle, and thus the duty cycle should always be less than unity. The total period of potential application in any one duty cycle must not be so long as to permit a runaway discharge to occur, and it has been found that the period for application of operating potential should not exceed about 1.8 milliseconds.

It is sometimes desirable to be able to automatically operate a variety of discharge devices, from a single fixture and control device. The various discharge devices exhibit very different dynamic impedance characteristics and operate at an optimum at widely varying operating voltages and repetition frequencies.

The conductivity of a low-dynamic impedance device changes very rapidly during the period of potential application, and this very fast response time threatens to create an unstable runaway discharge, so the high-repetition rate which approximates the response time, minimizes drastic conductivity changes and maintains a stable operating condition for the device.

The term dynamic impedance as used in this application means the instantaneously determinable self-impedance of the discharge device. The response time for changes of discharge impedance is the time required to reflect a discernable change in the dynamic impedance of the device. The control device of the present invention tailors the electrical input applied to the lamp to allow the discharge device to control itself. Changes in the dynamic impedance of the device are sensed by sensing some lamp-operating condition indicative of same and the electrical input is adjusted to maintain stable operation and control. A more specific embodiment allows the control device to be used on any number of different discharge devices which are observed to operate at an optimum mode, at different repetition rates depending upon the specific impedance characteristics of the given discharge.

In the embodiment of the invention shown diagrammatically in FIG. 4, the control device not only includes means for continuously varying the duty cycle of potential applied to the discharge device, but also means for continuously varying the frequency of application of potential or repetition rate of potential applied to the discharge device. This latter provision allows the control device to be used with discharge devices of varying or distinctly different dynamic impedances or where the dynamic impedance of the discharge device varies widely over its life. It has been discovered that there is an optimum range of frequency application for discharge devices of specific dynamic impedance characteristic. The control device can have a variable repetition rate which is determined by a feedback control signal which is generated by sensing a lamp-operating condition and comparing this to a predetermined signal value which is indicative of a predetermined desired operating condition, and thereby generating the feedback control signal.

In FIG. 4, I1 is a current signal proportional to the average power error, which is had for example by utilizing a transistorized wattmeter such as described and explained in copending application, Ser. No. 807,659, filed Mar. 17, 1969 by the present applicants, and owned by the present assignee.

The averaged signal produced by the transistorized watt meter can be readily compared to a constant reference signal proportional to a predetermined desired average wattage, to generate I1. This constant reference signal can be produced by a constant current generator as described in the aforementioned copending application, with the constant current node proportional to a desired average wattage for the lamp. An exemplary circuit for the means for generating I2, as a function of the lamp voltage is shown in FIG. 4A. The resistors R20 and C7 produce a negative voltage proportional to average lamp voltage. The signal I2 is arrived at by summing the currents at node K.

In the circuit of FIG. 4, a current I1, is generated which is proportional to the average power error. The average lamp power is monitored as was the average lamp current in the embodiment shown in FIG. 2. A signal is generated which is a function of the average lamp power, and this signal is compared to a reference signal which corresponds to the desired average power rating. An average power error signal is then applied to a controlled current source, and I1 is the resulting current which is proportional to the average power error.

The lamp voltage $V_L$ is continuously monitored during operation, and the circuit includes means for generating a current I2 which is a function of the lamp voltage.

The transistors Q10 and Q11 are arranged as differential amplifier components. A pulsed output voltage signal is generated which has a duty cycle and repetition rate which is determined by the values of I1 and I2 respectively.

The magnitude of I2 determines the rate of increase of $V_{ct}$, and when $V_{ct}$ reaches $\eta V_B$, the unijunction transistor Q12 fires and $V_{ct}$ goes to zero, and is thereafter recharged repetitively.

The pulsed output signal has a frequency of $f = I_2/2\eta\ C3V_B$, and a duty cycle $= 1 - R1I_1/\eta V_B$. Thus, by variations of I1, the duty cycle can be controlled, and by variation of I2 the frequency can be controlled. The waveform diagrams of FIG. 5 demonstrate how the control is effected. The potential $V_{ct}$ is a sawtooth with the slope of the ramp portion being a function of the magnitude of $I_2$. The magnitude of signal $I_1$ determines at what value of $V_{ct}$ an output pulse is initiated. Referring to FIG. 5, during the time interval from 1 to 2, I1 is constant at a value lower than the preferred level, which means there is no change in power error function, so that the point at which the output signal pulse starts remains the same. Thus, I2 is constant which means the point when the unijunction Q12 fires and $V_{ct}$ goes to zero is the same, thus one has controlled turn-on time and the frequency for the output signal. This necessarily means that the off time and the duty cycle are determined. Now at time 2, a step increase in I1 takes place which corresponds to an increase in power error signal which means that the turn-on time for the output signal will occur at a higher value of $V_{ct}$. Since I2 is still constant and the frequency is thus constant, the duty cycle is decreased. At time 3, I2 increases in a stepped function manner and thus the slope of the waveform $V_{ct}$ increases and there will be a change in the repetition frequency, but since I1 remains the same the duty cycle remains the same. At time 4, I1 increases above the preferred reference value and thus the turn on time will occur at a still higher value of $V_{ct}$, I2 decreases and thus the slope of waveform $V_{ct}$ is not as sharp and the repetition frequency is reduced.

The output signal from the transistorized differential amplifier system is used to drive the power amplifier, which comprises a power supply and transistor bridge such as shown in FIG. 2, to power the discharge device.

Figure 6:
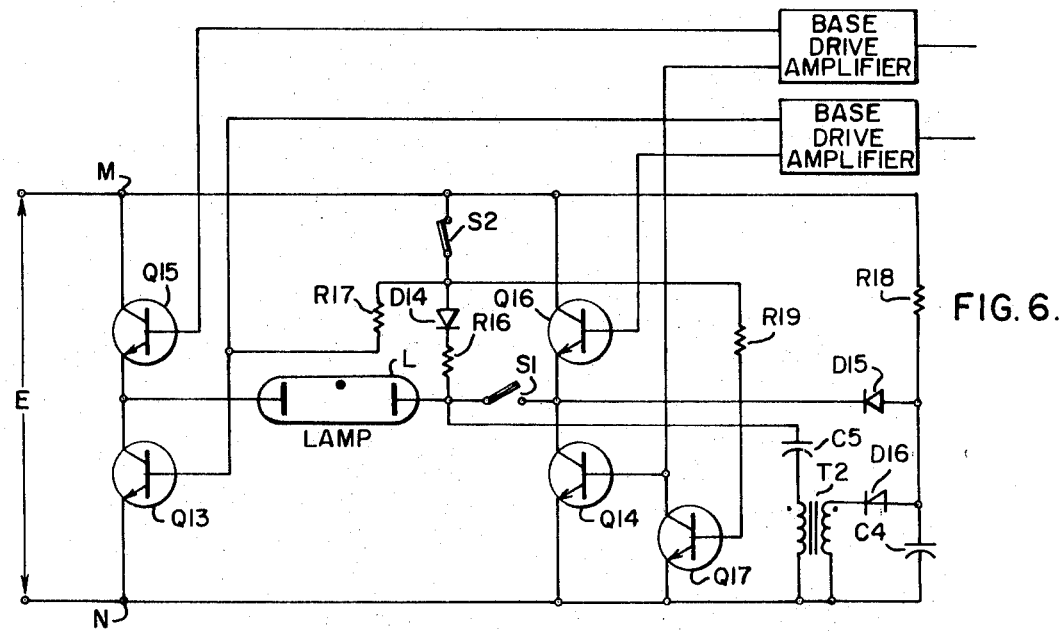
FIG. 6 is an embodiment of a starting circuit for use with the embodiment of the invention in FIG. 2.

In yet another embodiment of the invention as shown in FIG. 6, a starting circuit is shown which is used to deliver high voltage starting pulses to particular discharge devices exhibiting a high initial impedance such as sodium-mercury amalgam discharge device, to insure initial warmup to an operational impedance level. The circuit shown will allow the high voltage pulse to be applied to the discharge device, yet will isolate the voltage from damaging the transistorized inverter. The starting circuit is only in operation when the temperature of the discharge device is below a predetermined warmup level, above this warmup temperature no high-voltage pulses are generated and the starting circuit plays no part in the operation of the control device.

The starting circuit shown in FIG. 6 comprises, the high voltage pulse forming means formed by R18, C4, D16, T2, C5, the lamp warmup current path formed by S2, D14, and Q13, the gate drive for Q13 through S2 and R17, and the gate drive through S2 and R19 for transistor Q17 which is used to control the base of transistor Q14, to keep Q14 turned off during warmup. Switches S1 and S2 are temperature-sensitive vacuum bimetal switches. The high voltage switch S1 is normally open at ambient temperature and serves to isolate transistors Q14 and Q16 of the control device transistorized inverter from the high-voltage starting pulses. The switch S1 is spaced proximate the operating discharge device so that S1 closes when the discharge devices reaches a predetermined operating temperature after the warmup period. The switch S1 is between the output portion of the pulse-forming means and the low-impedance switching means to isolate the low-impedance switching means from the side of the discharge lamp to which the high-voltage pulses are applied. The switch S1 is responsive to a lamp-operating condition such as temperature, to close and effectively remove operating potential across the pulse-forming network because of the low-impedance path through D15, closed S1, and the discharge lamp. The switch S2 is also spaced proximate the discharge device and is normally closed at ambient temperature. In one path S2 serially connects the operating potential via S2 and R17 to the base of transistor Q13, to drive Q13 on, and since the emitter of Q13 is connected to the operating potential source this provides a current path for the warmup current via S2, D14, R16, the discharge device, and Q13. This warmup current will flow when the high voltage starting pulse is applied to the discharge device. When the discharge device reaches a predetermined operating temperature, S2 senses this and opens a predetermined time after S1 closes, thus eliminating the warmup current path, and removing the control of Q14. The primary transistorized control circuit is now able to perform as described before in reference to FIG. 2. The base drive signals for the transistorized bridge of FIG. 6 is derived as explained in describing FIG. 2. The circuit points M and N of FIG. 6 correspond to points A and B of FIG. 2.

We claim as our invention:

1. A control device which constitutes a part of a low-impedance power supply for operating a discharge lamp without effective current-limiting impedance means in circuit therewith, which lamp when normally operated from a low-impedance power supply will exhibit a runaway discharge characteristic, said control device comprising:

a. input terminals adapted to be connected to a voltage main, and output terminals adapted to be connected to said discharge lamp,
   b. low impedance switching means operable to rapidly and repetitively direct electrically connect and then disconnect said input terminals and said output terminals at a repetition rate of at least about 500 times per second, said input and output terminals when directly electrically connected by said switching means having no effective lamp current-limiting impedance in circuit therewith, said switching means operable to maintain connection between said input terminals and said output terminals for a time period not exceeding about 1.8 milliseconds, said switching means having a duty cycle of operation which constitutes the time duration of any individual period of connection of said input and output terminals divided by the time duration between successive connections of said input and output terminals, and said duty cycle always being less then unity,
   c. feedback control means responsive to a lamp-operating condition to generate at least one feedback output signal indicative of such lamp-operating condition; and
   d. connection means between the output of said feedback means and said switching means to apply said feedback signal to said switching means to operate same to vary said duty cycle to maintain said lamp-operating condition at about a predetermined desired level of operation.

2. The control device as specified in claim 1, wherein said lamp-operating condition is the average lamp wattage.

3. The control device as specified in claim 1, wherein said feedback control means compares a signal which is indicative of said lamp-operating condition to a reference signal which is indicative of a predetermined desired level of lamp operating condition to generate said feedback output signal.

4. The control device as specified in claim 1, wherein said repetition rate is fixed at a predetermined value, and said feedback signal controls said switching means to vary said duty cycle to maintain said lamp-operating condition at about a predetermined desired level of operation.

5. The control device as specified in claim 1, wherein said discharge lamp is a low-pressure mercury vapor discharge lamp, and wherein said repetition rate is preferably from 1,000 to 40,000 times per second.

6. The control device as specified in claim 1, wherein said discharge lamp is a high-pressure mercury vapor discharge lamp, and wherein said repetition rate is preferably from 2,000 to 5,000 times per second.

7. The control device as specified in claim 1, wherein said discharge lamp is a metallic halide additive high-pressure mercury vapor discharge lamp, and wherein said repetition rate is preferably from about 2,000 to 20,000 times per second.

8. The control device as specified in claim 1, wherein said discharge lamp is a sodium-mercury amalgam high-pressure discharge lamp, and wherein said repetition rate is preferably from about 8,000 to 40,000 times per second.

9. The combination as specified in claim 1, wherein said means for generating a signal which is a function of the average power input to said lamp comprises means for sensing a signal which is a function of the average current through said discharge lamp, and means for comparing this sensed signal which is a function of the average current through the lamp to a fixed reference value which is representative of the desired lamp current, and generating a signal which is representative of the difference between actual average current and desired average current.

10. The control device as specified in claim 1, wherein said low-impedance means comprise a plurality of transistors forming a transistorized inverter coupling said discharge lamp to a source of operating potential, with the feedback control output signal applied as the base drive to said transistors.

11. The device as specified in claim 1, wherein starting means are coupled to said low-impedance switching means, said starting means comprising;
   a. pulse forming means connected across said input terminals for generating high-voltage starting pulses across said output terminals when said pulse forming means is connected to a source of operating potential, and the resulting high voltage pulses being applied across said discharge lamp for lamp start-up;
   b. a normally open high-voltage switching means between the output portion of said pulse-forming means and said low-impedance switching means to isolate said low-impedance switching means from said high-voltage pulses, said high-voltage switching means responsive to a predetermined low-impedance lamp operating condition to close and effectively remove operating potential from across said pulse-forming means;
   c. lamp warmup network means comprising a normally closed switching means and a current-limiting impedance serially connected with said lamp, and said normally closed switching means responsive to a predetermined lamp-operating condition to open after said normally open high-voltage switching means closes, and said low-impedance means responsive to opening of said normally closed switching means to initiate operation of said low-impedance switching means, whereby when said starting means has operating potential applied thereto, said high-voltage pulses are applied across said lamp and a warmup current flows through said lamp, and after said lamp is warmed up, said normally closed switching means opens to isolate said warmup network from said operating potential.

12. The device as specified in claim 1, wherein said signal representative of average power input is proportional to the average current for said discharge lamp, and the feedback control signal is applied to said switching means to vary the connection period of said input and output terminals, the disconnection period, and thus the resulting duty cycle.

13. The control device as specified in claim 12, wherein said feedback control signal varies both said repetition rate and said connection period of said input and output terminals.

14. The combination as specified in claim 13, wherein said feedback control means includes means for sensing the potential across the discharge device and for generating a feedback signal which is indicative of said potential across the discharge device.

15. The method of operating a discharge lamp from a variable power-output low-impedance potential source with an average predetermined power input, which lamp when normally operated from a low-impedance potential source will exhibit a runaway discharge characteristic, which method comprises:
   a. energizing said lamp from a variable power-output low-impedance potential source, with no effective lamp ballasting impedance in circuit therewith, with pulsed-type excitation having a repetition rate of at least about 500 times per second, the duration of any individual excitation pulse not exceeding about 1.8 milliseconds, and the duty cycle which constitutes the time period for which any individual pulse is applied divided by the time period defined by the initiation of such excitation pulse to the initiation of the next succeeding pulse always being less than unity, and said variable power-output low-impedance potential source responsive to a control signal to vary said duty cycle to vary the power output thereof;
   b. monitoring a predetermined operating characteristic of the operating lamp to generate a control signal which is indicative of whether the operating lamp has an average wattage input thereto which is less than desired, or more than desired, or is at about that wattage input thereto which is desired;
   c. applying the control signal to the low-impedance potential source to vary the duty cycle to vary the average power input to the operating lamp as required to maintain such average power input at about its predetermined desired value.

* * * * *